United States Patent [19]

Bennett et al.

[11] 4,427,747

[45] Jan. 24, 1984

[54] BRONZE SUPPRESSION IN AN ALKALI METAL/SULFUR AMMONIA BATTERY

[75] Inventors: John E. Bennett; David E. Harney, both of Painesville, Ohio

[73] Assignee: Diamond Shamrock Corporation, Dallas, Tex.

[21] Appl. No.: 343,468

[22] Filed: Jan. 28, 1982

[51] Int. Cl.$^3$ .......................................... H01M 10/36
[52] U.S. Cl. .................................... 429/50; 429/101; 429/105
[58] Field of Search ............... 429/101, 110, 199, 201, 429/196, 50, 105

[56] References Cited

U.S. PATENT DOCUMENTS

| | | | |
|---|---|---|---|
| 2,863,933 | 12/1958 | Minnick et al. | 429/101 |
| 2,937,219 | 5/1960 | Minnick et al. | 136/6 |
| 2,996,562 | 8/1961 | Meyers | 136/6 |
| 3,532,546 | 10/1970 | Harris | 136/83 |
| 3,573,987 | 4/1971 | Knight | 136/83 |
| 4,166,388 | 9/1979 | Rao | 429/194 |

OTHER PUBLICATIONS

"Voltage Delay in Lithium Non-Aqueous Battery Systems", A. Leef and A. Gilmour, *Journal of Applied Electrochemistry*, 663 (1979).

"Capacity, Rate Capabilities and Rechargeability of a Lithium/Dissolved Sulfur Secondary Battery," R. D. Rawh, G. F. Pearson, S. B. Brummer, 77-6 *Proceedings of the Electrochemical Society*, 998 (1977).

*Primary Examiner*—Donald L. Walton
*Attorney, Agent, or Firm*—Woodrow W. Ban; Arthur S. Collins

[57] ABSTRACT

A battery employing an alkali metal-sulfur electrochemical reaction pair in an anhydrous ammonia electrolyte environment including an anolyte and method for suppressing formation of a bronze between the ammonia and the metal and a method for making the anolyte. The anolyte includes a bronze suppressing, conductivity enhancing salt of the alkali metal and a bronze suppressing aromatic organic dissolved in the anhydrous ammonia.

41 Claims, 3 Drawing Figures

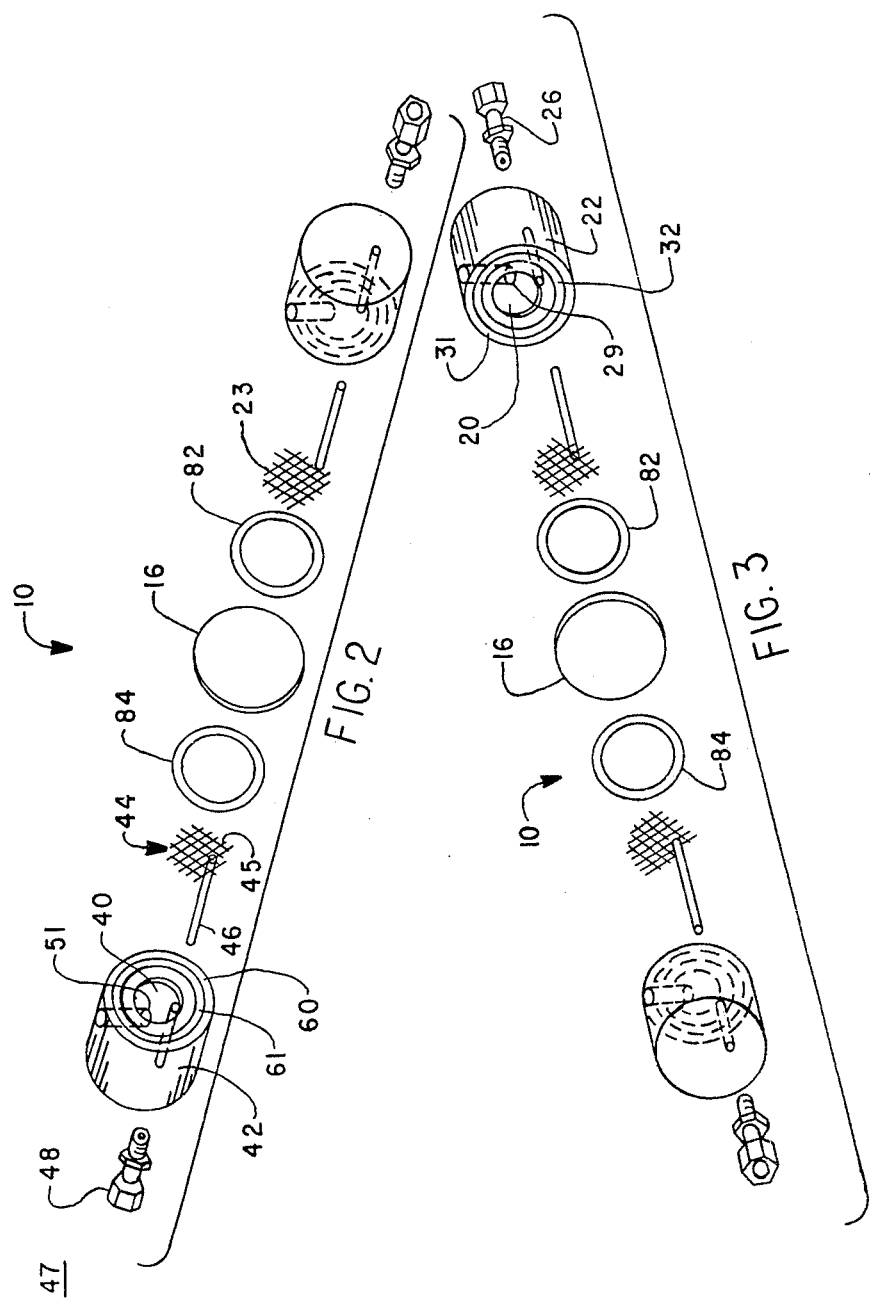

BRONZE SUPPRESSION IN AN ALKALI METAL/SULFUR AMMONIA BATTERY

FIELD OF THE INVENTION

This invention relates to electrical current storage batteries and more specifically to an apparatus and method for suppressing bronze formation in a rechargeable electrical current storage cell utilizing a reversible electrochemical reaction between an alkali or alkaline earth metal and sulfur for the storage and release of an electrical current.

BACKGROUND OF THE INVENTION

The basic concept of chemical generation and storage of electricity is quite old. Batteries can be traced to 1795 when Volta discovered that two dissimilar metals, placed in an electrically conductive fluid establish an electromotive force from which an electric current can be tapped. Various materials employed as electrodes, a variety of electrolyte possibilities, and numerous combinations of electrodes and electrolytes subsequently have been the object of considerable experimentation for nearly 200 years.

Electrochemical cells generate power when two energetic materials participate in a controlled oxidation-reduction reaction occurring in an ionically conductive electrolyte. Electrons are transferred in the reaction, and these transferred electrons are collected and distributed by a pair of electrodes generally fabricated from metal, carbon, or the like. Electrons collected at one cell electrode are generally passed through an electrical load circuitry before being returned to the other electrode.

There are two basic electrochemical cell types. Secondary, or rechargeable cells generate electrical energy until some unacceptably low power output is reached caused by depletion of the reactants. Electrical current flow through the cell is thereupon reversed to cause a reversal of the oxidation reduction reaction by which the cell generates power. When a suitable portion of the cell reactants have undergone the reverse reaction, the cell is "recharged" and ready again to provide energy.

Primary cells generate power identically by an oxidation reduction until the reactants contained within the cell have essentially become spent. However, for a variety of reasons having their roots in the nature of the cell reaction or the cell physical configuration, current reversal to recharge the battery is not practical, and the cell is discarded or perhaps recycled.

In much battery development, emphasis has traditionally focused upon locating reactants producing a large amount of energy for a given reactant weight and volume. In addition, it has been necessary to locate conductive electrolytes, chemically compatible with the reactants. However, in larger rechargeable batteries, emphasis has traditionally focused upon improvements to battery electrodes and electrolytes aimed at producing a reasonably efficient battery at very low cost. As a result of this emphasis, these batteries have frequently incorporated low cost individual electrochemical reactants to generate the electromotive energy producing relatively small amounts of energy for a given weight of reactants. As a result of such a low ratio of evolved energy to weight, relatively large amounts of the reactants necessarily have been included in these rechargeable batteries to produce a desired current over a required period of time. For example, according to theoretical calculations, the energy density capability of a lead acid storage battery is about 200 watt-hours per kilogram of reactants.

More recently, in an effort to develop transportation alternates for use in an impending world oil shortage, attempts have been made to power automotive vehicles utilizing electrically powered drive trains drawing electricity from storage batteries contained within the automotive vehicle. An automotive vehicle driven utilizing power provided by batteries carried within the vehicle is transporting the weight of not only the vehicle and its contents, but also of the storage batteries. It is known that vehicle efficiency is strongly dependent upon the weight carried within the vehicle. It has been found that automotive vehicles driven utilizing electrical current from conventional storage batteries having a relatively low energy density generally are not satisfactory. A conventional storage battery providing sufficient electrical current to operate a reasonably commodious automotive vehicle at acceptable speeds and over an acceptable distance is necessarily so weighty that efficient vehicle operation is impaired seriously.

Various attempts have been made to develop a rechargeable storage battery providing a relatively large amount of electromotive energy per unit weight of the battery. Those skilled in the art, referring to the Periodic Table of Elements, have long recognized the alkali and alkaline earth metals and sulfur as possessing the desirable high energy and low weight characteristics. Electrochemical reactions between lower atomic weight alkali metals and sulfur and between lower atomic weight alkaline earth metals and sulfur have long been recognized as potentially providing relatively large energies of reaction from reactants of attractively low weight. For example, according to theoretical calculations, a lithium sulfur battery can produce 2600 watt-hours of energy per kilogram of reactants, a lithium iron disulfide battery about 1100 watt-hours.

A number of proposals have attempted to pair alkali or alkali earth metals with sulfur to produce an efficient storage battery. Many of these proposals have related to primary batteries, that is, batteries designed to use the electrochemical energy of freshly activated battery reactants only once; recharging of these batteries not being contemplated. Alkali or alkaline earth metals reacting with sulfur in such primary batteries have been found to provide acceptable primary battery performance, particularly where an anhydrous electrolyte such as ammonia has been used in the battery. Under anhydrous conditions batteries utilizing, for example, a lithium-sulfur electrochemical reaction pair will produce adequate electrical voltage at operating temperatures significantly below those where an aqueous battery would have become nearly dormant.

Previous proposals for rechargeable batteries utilizing an electrochemical reaction pair involving an alkali or alkaline earth metal and sulfur have proven less satisfactory.

In one proposal, sodium and molten sulfur have been selected as the oxidation reduction reactants. However, the high temperature required in these sodium sulfur batteries has caused serious practical difficulties associated with both heat insulation, particularly of bus bars and bus bar connections, and the make-up supply of heat during periods of extended battery dormancy. Battery housing materials, by necessity, must resist both the elevated temperature and corrosive attack from the reactants. Impurities such as moisture are generally severely dysfunctional to these batteries.

In another high temperature battery, lithium and iron disulfide in a molten salt electrolyte comprise the reactant pair. Beyond the same problems associated with high temperature sodium sulfur batteries, these lithium-iron disulfide cells can suffer from temperature induced iron disulfide instability and short cycle lives attributable at least in part to material migration difficulties.

There have been proposals for the use of an alkali, or alkaline earth metal sulfur, cell-oxidation reduction reaction at ambient temperature. In one such proposal, alkali metal-sulfur electrochemical reaction pairs such as lithium-titanium disulfide or lithium-sulfur have been utilized in combination with organically based electrolytes including dissolved salts. Short cycle lives of such batteries combined with a slow reaction between the organic electrolyte and the alkali metals such as lithium or sodium have dampened development of such batteries. Further, no wholly satisfactory organic electrolyte has yet been found particularly with respect to ionic conductivity. A low ionic conductivity tends not to support adequate cell discharge rates.

In another proposal, electrochemical batteries have utilized a cation producing alkali or alkaline earth metal anode and sulfur cathode together with an electrolyte solute such as an inorganic nitrate or perchlorate of the metal cation dissolved in a cell fluid such as ammonia. Such cells or batteries have demonstrated a capability of being recharged but also have demonstrated rapid decay in cell performance as measured by a reduced current and voltage output of the cell with each subsequent recharging. This decay in cell performance has been attributed to competing reactions between the chemical reactants within the cell, thereby reducing the quantity of chemicals available for storage of current.

It has been further proposed that such cells be divided to separate cell chemical components from one another in an effort to reduce the competing reactions between the electrochemical components. Division has not yet produced a wholly effective rechargeable alkali metal or alkaline earth metal-sulfur battery cell. One significant factor interfering with effective divided cell performance has centered about difficulties in finding a satisfactory divider material that resists destructive effects of fluids in the cell and yet passes metal cations. Another factor has been lack of a suitable supporting electrolyte for use in the cells that does not contribute significantly to competing cell reactions.

Water has long been a favored electrolyte solvent for use in rechargeable batteries. Water has not proven successful as an electrolyte solvent for batteries utilizing alkali and alkaline earth metal-sulfur reactions. Many of the metals react violently with water, and most forms of sulfur useful in the battery reaction are at best insufficiently soluble in the water.

Liquid ammonia exhibits many of the properties that make water a highly desirable battery electrolyte solvent. $NH_3$ is highly hydrogen bonded, resulting in an unusually elevated boiling point and a substantial heat of vaporization. Ammonia is a protonic, ionizing solvent superior to virtually all but water in dissolving a wide range of electrolyte salts; some salts conduct electricity better in $NH_3$ than in water.

Yet there are differences between water and liquid ammonia. $NH_3$ liquid is known to dissolve alkali and alkaline metals to form solutions of a metallic nature when concentrated. These so-called bronzes generally possess characteristics of both electronic and ionic conductance. Such dual properties can be attractive in batteries.

These bronzes have been generally recognized as thermodynamically unstable; some literature reporting half lives as short as 190 hours. Such half lives would preclude utility in most secondary battery applications.

Ammonia is characterized by a theoretical dissociation voltage of 77 millivolts at 25° C. Such a low voltage would seem to seriously limit the use of ammonia in batteries wherein individual cell voltages of in excess of one volt are highly desired. Later evidence has indicated that the actual dissociation voltage of ammonia is significantly in excess of 77 millivolts as a result of significant electrode overvoltages. For these and other reasons, except for use in some primary batteries wherein the ammonia was introduced into the battery immediately prior to battery use, ammonia and ammonia bronzes have not been utilized extensively in batteries.

The use of sulfur as a cathode in conjunction with an ammonia solvent has been suggested since sulfur readily dissolves in ammonia. The kinetics of cell electrochemical reactions in which elemental sulfur is dissolved in ammonia together with supporting electrolytes such as salts have been determined to be quite slow, potentially limiting current flow rates when applied to batteries. Previous proposals have attempted to utilize a sulfur cathode in conjunction with an ammonia electrolyte by the addition of compounds such as alkali metal nitrates, perchlorates, throcyanats, and the like.

It is with cell dividers that additional difficulties with alkali or alkaline earth metal sulfur batteries have been encountered and particularly those with an ammonia electrolyte solvent. It is desirable to separate sulfur from the anode vicinity in such cells to reduce competing cell reactions. Until now, a substantially satisfactory cell separator or partition has not been developed that would (1) retain sulfur in a cell cathode compartment, (2) readily transport cell metal cations, and (3) resist both cell chemical corrosiveness and blocking by-products of competing cell reactions.

In some configurations of a battery using an alkali or an alkaline earth metal anode, it is desirable that anhydrous ammonia be used as an electrolyte within the cell. Often these cells are divided by a partition or a membrane and utilize anhydrous ammonia as an electrolyte. Where a bronze forms between the alkali or alkaline earth metal and the ammonia, this aggressive metal bronze can cause severe damage to, particularly, sensitive cation exchange membranes, but also to partitions such as porous devices. It is known that providing an electrolyte (anolyte) containing a relatively large quantity of salts of the alkali or alkaline earth metal forming the anode in the anode compartment of such a cell can suppress formation of the bronze. However, the relatively large quantities of the salt required for bronze suppression can also prove damaging to performance of the partition or membrane as well by blocking the membrane to ion transport and can promote side reactions in the cell that can markedly decrease performance.

DISCLOSURE OF THE INVENTION

The present invention is a method for suppressing formation of a bronze between an alkali earth metal anode present in the anode compartment of a partitioned battery cell and anhydrous ammonia used for anolyte purposes in the cell. An anhydrous ammonia anolyte made in accordance with the invention and utilized in a partitioned battery having an alkali or alkaline earth metal anode results in an improved battery anode assembly wherein the anode metal is present in solid form in lieu of being in a liquid form and dissolved in anhydrous ammonia to form a bronze.

Bronze formation in the anode compartment of a rechargeable battery containing an alkali or alkaline earth metal and an anhydrous ammonia anolyte is suppressed by the introduction of two substances into the anhydrous ammonia. One substance introduced is at least one alkali or alkaline earth metal salt having the characteristic of suppressing formation of metal bronzes and also having the characteristic of enhancing conductivity of the anhydrous ammonia. The remaining substance is at least one organic having bronze suppressing characteristics and being substantially chemically inert to both the anhydrous ammonia and the anode metal.

An anolyte made in accordance with the instant invention is used in a partitioned battery having an alkali or alkaline metal-sulfur reaction pair. Such use results in an improved anode compartment configuration or assembly wherein an anodic current collector contacts an anode of the alkali or alkaline earth metal. This anode is of a substantially solid form in lieu of being a liquid bronze. The anhydrous ammonia anolyte including the added substances fills areas of the anode compartment between the anode and partition, conducting charged chemical species to and from the anode, while suppressing formation of a bronze.

A battery made for utilizing the anolyte and improved anode compartment includes a housing surrounding a central chamber. A partition divides the chamber into two compartments. The partition is sealed to the housing to substantially resist movement of fluids between compartments.

An anode is placed within one of the compartments and electrically connected via the anode current collector with the outside of the housing. A cathode of a suitable or conventional type is positioned within the other compartment in electrical communication with the outside of the housing. The compartment containing the cathode also contains a catholyte fluid that includes sulfur or polysulfides. A provision is made for equalizing pressure between the compartments.

The anode is an alkali or alkaline earth metal structure. The catholyte is a blend of anhydrous ammonia and sulfur or anhydrous ammonia and polysulfides corresponding to the metal comprising the anode or a mixture of both sulfur and metal polysulfides in anhydrous ammonia. The anolyte is a mixture of anhydrous ammonia and the bronze suppresssing substances.

The catholyte supports adequate cell current flow well, though having no supporting electrolyte, contrary to the thinking and practice in the prior development of batteries relying upon a reaction between an alkali or alkaline earth metal and sulfur.

The partition separating the compartments is of a type freely permeable to cations of the metal but substantially resisting passage of sulfur or metal polysulfides between the compartments. During discharge of the battery, cations of the metal are released by the anode producing electrons at the anode current collector. These cations pass through the partition from the anode compartment to the cathode compartment. The cations react with sulfur or metal polysulfides in the cathode compartment which absorb electrons from the cathode. Upon recharging of the battery, the metal polysulfides surrender electrons to the cathode, and the metal cations pass through the partition from the cathode compartment to the anode compartment returning to the anode where electrons are reabsorbed.

In a preferred embodiment, the anode is formed from sodium, lithium, calcium or potassium metals.

The catholyte is prepared by blending polysulfides corresponding to the metal of the anode into anhydrous ammonia. Generally where the anode metal is an alkali metal, the catholyte is prepared by blending alkali metal polysulfides in a composition range of from $M_2S_4$ to $M_2S_{18}$ and in a concentration of from 2 moles per liter to saturation in the ammonia. Where the liquid anode metal is an alkaline metal, the catholyte is prepared by blending alkaline earth metal polysulfides in a range of composition of from $MS_4$ to $MS_{18}$ and in a range of concentration of from 2 moles per liter to saturation in the ammonia.

Generally, cells utilizing catholytes employing shorter chain polysulfides tend to exhibit reduced voltage and current characteristics from those utilizing longer chain polysulfides. Cells utilizing longer chain polysulfides tend to ungergo more rapid decay in cell performance following successive rechargings than cells utilizing shorter chain polysulfides. Polysulfides including a range of between $M_2S_4$ and $M_2S_{18}$ and including a range of $MS_4$ and $MS_{18}$ provide a generally satisfactory compromise between cell life and cell efficiency.

In one version of a preferred embodiment, the partition is a thin sheet membrane formed from a blend of materials that include a substantial proportion of a copolymer of polyethylene and methacrylic acid or a copolymer of polypropylene and methacrylic acid or a polymeric cation exchange membrane grafted with sulfonic or carboxylic acid. Depending upon the nature of the cell chemicals, a microporous membrane such as microporous polypropylene, microporous alumina or glass frit may be utilized. It has been found that sulfur migration across the partition is a significant contributor to decay in cell performance following repeated rechargings and that the selection of a membrane for a particular cell will be governed to a large degree by its resistance to sulfur migration in the particular cell environment and by its resistance to attack by contents of both anode and cathode compartments of the cell.

The above and other features and advantages of the invention will become apparent from the following detailed description of the invention made with reference to the accompanying drawings which form a part of the specification.

DESCRIPTION OF THE DRAWINGS

FIG. 2 is an exploded view of the cell of FIG. 1 viewed from the anode end of the cell.

FIG. 3 is an exploded view of the cell of FIG. 1 viewed from the cathode end of the cell.

BEST MODE FOR CARRYING OUT THE INVENTION

Figure 1:
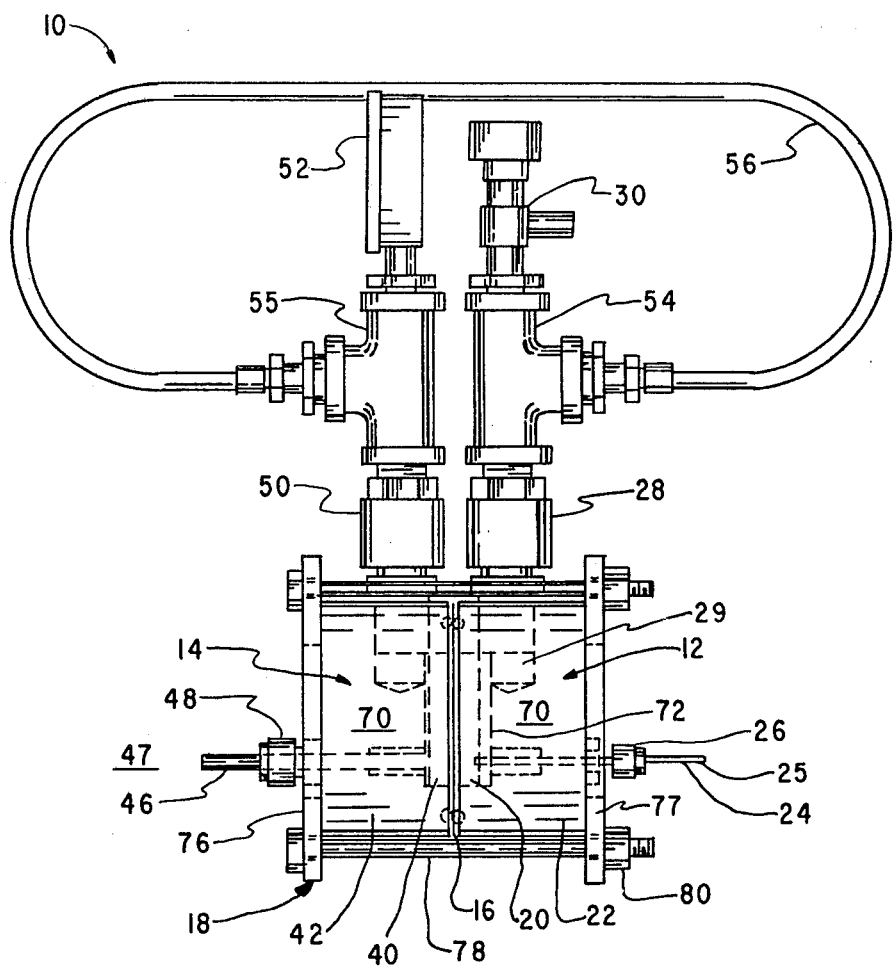
FIG. 1 is a frontal view of a battery cell made in accordance with this invention.

Referring to the drawings, an electrical storage battery cell 10 is shown in FIGS. 1-3. The cell is comprised of an anode subassembly 12, a cathode subassembly 14, a divider 16 or partition separating the subassemblies and a retaining assembly 18 joining the subassemblies. Assembled and properly filled, the cell is capable of rechargeably storing and releasing electrical current utilizing electrochemical reactions.

The anode subassembly is comprised of an anode compartment 20 formed by any suitable or conventional method within a generally cylindrical anode subhousing 22, and an anodic electrical current connector 24 or feeder between the compartment 20 and a point 25 outside of the subhousing 22. The electrical connector 24 is fabricated from a suitable or conventional material such as titanium, stainless steel or the like. The connector may optionally be equipped with a suitable or conventional grid or other structure (not shown) upon which anode metal may accumulate.

A fitting 26 supports the electrical connector 24 within the anode compartment 20 and performs as a seal, cooperating with the electrical connector 24 to resist leakage of fluid contained in the anode compartment 20 along the electrical connector 24 to the exterior of the subhousing 22 while the cell 10 is assembled and in use.

A fluid inlet 28 is provided for introducing an anolyte into the anode compartment. A fluid passage 29 communicates fluid through the subhousing 22 from the fluid inlet 28 to the anode compartment 20. A valve 30 is provided to retain fluid within the anode compartment.

The subhousing 22 includes a mating surface 31. A groove 32 of a size and shape suitable for receiving an "O" ring is formed in the mating surface.

When assembled into a cell, the anode subhousing is subject both to internal pressure generated by chemicals such as ammonia contained within the cell and to chemical attack by those contained chemicals. The housing, therefore, is formed from a material resistant to attack by chemicals contained within the cell and of a sufficient thickness and strength to withstand pressures anticipated within the anode compartment during operation of an assembled cell. In the best embodiment, the anode subhousing 22 is formed from a plastic material such as polyethylene, polypropylene, or the like.

The cathode subassembly 14 is comprised of a cathode compartment 40 formed by any suitable or conventional method within a generally cylindrical cathode subhousing 42 and a cathode 44. Like the anode subhousing 22, and for the same general considerations, the cathode subhousing 42 is formed from a plastic material such as polypropylene, polyethylene or the like of a sufficient thickness and strength to withstand pressures anticipated within the cathode compartment during operation of an assembled cell.

The cathode 44 is comprised of a generally circular metal mesh structure 45, and an electrical connector 46 fixedly supporting the mesh structure 45, and electrically communicating between the mesh structure 45 and a point 47 outside the cathode subhousing 42. A cathode seal fitting 48 retains the electrical connector 46 in a predetermined position within the cathode compartment 40, thereby positioning the mesh structure 45 within the cathode compartment 40.

In the best embodiment, the cathode 44 is a dimensionally stable electrode comprising a generally well-known valve metal such as titanium, or the like, coated with an oxidized metal coating system such as Diamond Shamrock CX-DSA ®, a propriatory Diamond Shamrock Corporation electrode coating system producing an electrode surface containing tin, ruthenium, and titanium oxides, or the like. Depending upon the chemicals utilized within the cell, other suitable or conventional cathode materials, including but not limited to, other valve metals coated with suitable coating systems, and carbon, may be used. Any such other cathode materials utilized must be relatively impervious to attack by chemical compounds contained or naturally occurring within the cell. Any alternate cathode materials must be of a suitable or conventional type for catalyzing the electrochemical reaction of sulfur or the alkali metal polysulfides.

A cathodic fluid inlet 50 is provided upon the cathode subhousing 42 for introducing a catholyte liquid into the cathode compartment 40. An inlet passage 51 communicates through the subhousing 42 between the fluid inlet 50 and the cathode compartment 40. A stopper 52 is provided to retain catholyte within the cathode compartment 40 when the cell is assembled. In the best embodiment, this stopper 52 also performs as a pressure gauge.

Connections 54, 55 are provided respectively on the anode fluid inlet 28 and the cathode fluid inlet 50. These connections are joined by a conduit 56 whereby pressures in the anode compartment 20 and the cathode compartment 40 can be equalized.

The cathode subhousing 42 includes a mating surface 60. A groove 61 is formed in the mating surface of a size and shape suitable for receiving an "O" ring.

The subassemblies 12, 14 are joined utilizing the retaining assembly 18 to form the elctrical storage cell 10. The mating surfaces 31, 60 of the subhousing 22, 42 are pressed together joining the subhousings 22, 42 and compartments 20, 40 into a generally cylindrical housing 70 having a central chamber 72 as shown in phantom in FIG. 1. Retaining plate 76, 77 are positioned at each end of the housing and the plates are connected by strain rods 78 threaded over a portion of their length and attached to the plate, using fasteners 80. Tightening the fasteners presses the mating surface 31, 60 together.

The divider or partition 16 separates the anode and cathode compartments 20, 40 of the chamber 72. An "O" ring 82 is carried in one of the grooves 32, 61. The divider 16, of a size somewhat larger than a diameter of the "O" ring, is positioned between the mating surfaces 31, 60 and is then pressed into the unoccupied groove, if flexible, or against a second "O" ring 82 as the fasteners 80 are tightened to force the mating surfaces one toward the other. Interaction between the grooves 32, 61, the "O" ring 82, the second "O" ring, if used, and the divider 16 effectively seals against fluid communication between the compartments and fluid leakage from the chamber between the mating surfaces.

Typically, the anode compartment of a completed cell is charged before closing with an anode metal by placing the metal in the anode compartment or by coating a portion of the connector 24 with the metal. After closing, the anode compartment is charged with anolyte made in accordance with the instant invention. The cathode compartment is charged with a catholyte such as ammonia containing dissolved sulfur either in the form of elemental sulfur or in the form of metal polysulfides corresponding to the anode metal. Typically where the anode metal is lithium, the corresponding polysulfide is one of, or a mixture of, polysulfides ranging in composition from $Li_2S_4$ to $Li_2S_{18}$. When the anode metal is sodium, the corresponding polysulfide is one of, or a mixture of, polysulfides ranging in composition from $Na_2S_4$ to $Na_2S_{18}$. For calcium, a mixture of $CaS_4$ to $CaS_{18}$ is used, while $K_2S_4$ to $K_2S_{18}$ is used for potassium.

The divider 16 retains electrochemical reactants, the anolyte and catholyte, within the compartments, but is freely permeable to cations of the anode metal. The divider particularly must function to retain sulfur within the cathode compartment. Sulfur entering the anode compartment reacts with the anode, removing reactants from electrochemical activity within the cell, and decreasing the electrochemical capacity that can be stored within and released from the cell, as well as interfering with movement of cations through the divider.

A number of materials have been found effective in inhibiting migration of sulfur from the cathode compartment to the anode compartment while remaining freely permeable to anode cations. An effective group of partitions has been identified as polyethylene or polypropylene based cation exchange membranes that include functional groups of sulfonic or carboxylic acid such as a polyethylene cationic exchange membrane radiation grafted with sulfonated styrene. Examples include membranes manufactured as R-5010 by RAI Research Corporation. Membranes containing a substantial proportion of a copolymer of polyethylene and acrylic or methacrylic acid, or a copolymer of polypropylene and acrylic or methacrylic acid, such as Permion® 2291 40/20 or Permion® E-6001 membranes manufactured by RAI, or EAHT-1575 membranes manufactured by SAC, have been found to perform effectively as dividers. Other effective dividers have been found to be partitions having sintered glass "windows," microporous polypropylene membranes such as Cellgard® 5511, Daramic® microporous membranes formed from glass filled polypropylene, dividers of microporous alumina and elastomeric membranes including an alumina "window."

The anolyte is comprised of anhydrous ammonia and at least one substance from each of two groups. The anhydrous nature of the ammonia has been found important for cell conductivity and for preservation of the membrane as well as for avoiding undesired chemical interaction between water and the anode metal being used for electrochemical activity in the cell.

One substance introduced is a salt having bronze suppressing and conductivity enhancing characteristics when dissolved in the ammonia anolyte. Such a salt should be freely soluble in ammonia, and preferably is a salt of an alkali or alkaline earth metal. In this best embodiment, the salt is a bromide, nitride, iodide, perchlorate, or thiocyanate of the alkali or alkaline earth metal or mixtures thereof and preferably of the alkaline earth or alkali metal being used as the anode metal.

The salt is introduced in a quantity sufficient to promote bronze suppression and enhance cell conductivity. A salt concentration of between about 0.5 mole per liter and 9 moles per liter of ammonia generally is satisfactory with between about 1 mole per liter and 3 moles grams per liter being preferred.

The second substance is an organic having bronze suppression characteristics when dissolved in anhydrous ammonia. Preferably the organic is an aromatic. Organics selected should be substantially resistant to chemical reaction with the anode metal or the anhydrous ammonia. In this best embodiment, the aromatic organic is one of benzene, xylene, toluene and mixtures of some or all of these aromatics.

The organic is generally introduced into the anhydrous ammonia anolyte in a concentration of between about 0.5 mole per liter and 4 moles per liter ammonia. Preferably the aromatic organic concentration is maintained between about 0.5 mole per liter and 2 moles per liter ammonia.

The anode metal can be alkali or alkaline earth metal. It is desirable that the metal provides a relatively large quantity of electrical energy per unit weight of reactants. Since sulfur is the principal reactant at the cathode, one expedient for improving the energy per unit weight relationship is the use of anode metals having a relatively low molecular weight and a relatively elevated electropositive nature. Among the alkali and alkaline earth metals preferred in implementation of the instant invention are lithium, sodium, calcium and potassium. While other alkali or alkaline earth metals, to wit magnesium, rubidium, strontium, cesium and barium may be utilized, for reasons related to molecular weight, relative electropositive nature of the reactants, availability and cost, and mobility of the ions, they are generally less preferred.

The cell reactions for a cell made in accordance with this invention and utilizing a catholyte containing monovalent metal polysulfides of the form $M_2S_x$ have been postulated as follows:

at the anode:

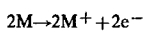

$$2M \rightarrow 2M^+ + 2e^-$$

at the cathode:

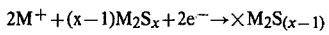

$$2M^+ + (x-1)M_2S_x + 2e^- \rightarrow xM_2S_{(x-1)}$$

for a reversible cell reaction of:

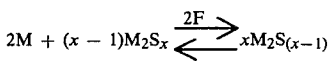

$$2M + (x-1)M_2S_x \underset{\longleftarrow}{\overset{2F}{\longrightarrow}} xM_2S_{(x-1)}$$

A similar cell reaction has been postulated for divalent metal polysulfides of the form $MS_x$ to wit:

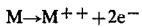

$$M \rightarrow M^{++} + 2e^-$$

$$M^{++} + (x-1)M_2S_x + 2e^- \rightarrow xMS_{(x-1)}$$

for a reversible cell reaction of:

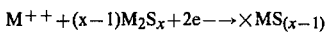

$$M + (x-1)MS_x \underset{\longleftarrow}{\overset{2F}{\longrightarrow}} xMS_{(x-1)}$$

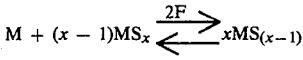

Similar reactions will be apparent to those skilled in the art for cells employing catholyte containing only sulfur.

Although a single embodiment of a preferred form of the invention has been illustrated and described in detail, the present invention is not to be considered limited to the precise construction disclosed. Various adaptations, modifications and uses of the invention may occur to those skilled in the art to which the invention relates, and it is intended to cover all such adaptations, modifications, and uses which come within the spirit or scope of the appended claims.

The following examples further illustrate the invention:

EXAMPLE 1

A cell structure was prepared according to the best means for carrying out the invention. The cell subhousings were constructed from polypropylene. A low density RAI R5010 membrane presenting a 16 square centimeter active surface to the cell was positioned between the cell subhousings to perform as a divider.

A titanium mesh anode was provided in the anode compartment of the cell. A titanium reticulate substrate coated with Diamond Shamrock CX-DSA, a mixture of tin, titanium and ruthenium oxides, was provided in the cathode compartment.

The anode compartment was charged with 13 grams of elemental sodium, 3 grams of sodium bromide, and 15 milliliters of ammonia. The cathode compartment was charged with 21 milliliters of ammonia and 5.5 grams of $Na_2S_{10}$.

The cell was discharged for 30 minutes and then charged for 30 minutes alternately for 45 hours at 6.2 milliamperes per square centimeter. The average voltage on discharge was 1.8 volts and the average voltage on charge was 2.7 volts.

After 45 hours, the cell was disassembled and examined for sodium deposits in the anode compartment.

Sodium deposits typical of those produced during the degradation of sodium bronzes were absent. A similar cell not having the sodium bromide present in the anode compartment displays these deposits upon disassembly.

EXAMPLE 2

A cell was assembled configured identically to the cell of Example 1 except that a high density RAI 5010 membrane was utilized as a divider. 2.5 grams of sodium, 2.2 grams of xylene, 1 gram of sodium bromide, and 18 milliliters of ammonia were charged to the anode compartment. 21 milliliters of ammonia and 6.5 grams of $Na_2S_4$ were charged to the cathode compartment.

Assembled, the cell was operated for 6 hours at a current density on the membrane at 6.2 milliampers per square centimeter on discharge and charge. Discharging was continued for 30 minutes followed by 60 minutes of charging. Cell voltage during the charge cycle was 3.0 volts; charge voltage during the discharge cycle was 1.0 volt.

After 6 hours, the cell was disassembled. Sodium deposits characteristic of those formed when sodium bronzes degrade were absent. A similar cell operated without the xylene and sodium bromide produces sodium deposits within the anode compartment characteristic of the degraded sodium bronze.

What is claimed is:

1. An anolyte for use in an anhydrous rechargeable storage battery having an electrochemical reactant pair of an alkali or alkaline earth metal and sulfur and utilizing a cation exchange membrane separating anode and cathode compartments within the battery comprising:
   essentially anhydrous ammonia;
   a bronze suppressing, conductivity enhancing salt of the metal substantially soluble in the anhydrous ammonia; and
   a bronze suppressing aromatic organic soluble in the anhydrous ammonia and substantially inert to chemical reaction with both the ammonia and the metal.

2. The anolyte of claim 1, the metal being one of sodium, lithium, calcium, and potassium.

3. The anolyte of claim 1, the salt being selected from a group consisting of bromides, iodides, nitrates, thiocyanates and perchlorates of the metal present in a concentration of between about 0.5 mole per liter and 9 moles per liter ammonia.

4. The anolyte of claim 1, the aromatic organic being selected from a group consisting of benzene, toluene and xylene present in a concentration of between about 0.5 mole per liter and 4 moles per liter ammonia.

5. An anolyte for use in an anhydrous rechargeable storage battery having an electrochemical reactant pair of sulfur, one of sodium, lithium, calcium and potassium metals and utilizing a cation exchange membrane separating anode and cathode compartments within the battery comprising:
   essentially anhydrous ammonia;
   a bronze suppressing, conductivity enhancing salt soluble in the anhydrous ammonia selected from a group consisting of bromides, iodides, nitrates, thiocynates and perchlorates of the metal; and
   a bronze suppressing aromatic organic substance soluble in the anhydrous ammonia and substantially inert to reaction with both the ammonia and the metal selected from a group consisting of benzene, toluene and xylene.

6. In the anolyte of claim 5, the salt being a salt of sodium.

7. In the anolyte of claim 5, the salt being present in a concentration of between about 0.5 mole per liter and 9 moles per liter ammonia.

8. In the anolyte of claim 5, the aromatic organic being present in a concentration of between about 0.5 mole per liter and 4 moles per liter ammonia.

9. A method for suppressing bronze formation in the anode compartment of a rechargeable battery containing an alkaline earth or alkali metal and anhydrous ammonia anolyte including the steps of:
   introducing into the ammonia a bronze suppressing, conductivity enhancing salt of said metal soluble in the ammonia; and
   introducing into the ammonia a bronze suppressing aromatic organic substance both soluble in the ammonia and substantially inert to chemical reaction with both the ammonia and the anode metal.

10. A method for suppessing bronze formation in the anolyte compartment of a rechargeable battery containing an anode metal selected from a group consisting of sodium, lithium, potassium and calcium, and containing anhydrous ammonia comprising the steps of:
    introducing into the ammonia a bronze suppressing, conductivity enhancing salt of the anode metal soluble in the anhydrous ammonia; and
    introducing into the ammonia a bronze suppressing aromatic organic substance both soluble in the anhydrous ammonia and substantially inert to chemical reaction with the ammonia and the anode metal.

11. The method of claim 10 wherein the salt is selected from a group consisting of bromides, iodides, nitrates, thiocyanates and perchlorates of the anode metal present in a concentration of between about 0.5 mole per liter and 9 moles per liter ammonia.

12. The method of claim 10 wherein the aromatic organic is selected from a group consisting of benzene, xylene and toluene present in a concentration of between about 0.5 mole per liter and about 4 moles per liter ammonia.

13. A method for suppressing formation of a bronze of anhydrous ammonia and an anode metal selected from a group consisting of sodium, lithium, potassium and calcium in the anode compartment of a chargeable battery utilizing a reaction pair of the anode metal and a sulfur compound comprising the steps of:

introducing into the anhydrous ammonia a salt selected from bromides, iodides, perchlorates, nitrides and thiocyanates of the anode metal; and introducing into the anhydrous ammonia an aromatic organic selected from a group consisting of benzene, xylene and toluene.

14. The method of claim 13, the salt being present in a concentration of between about 0.5 mole per liter ammonia and 9 moles per liter, and the aromatic being present in a concentration of between about 0.5 mole per liter and about 4 moles per liter ammonia.

15. The method of claim 13, the aromatic organic being present in a concentration of between about 0.5 mole per liter and 2 moles per liter ammonia.

16. The method of claim 13 wherein the anode metal is sodium.

17. In a rechargeable battery utilizing an electrochemical pair of an alkali or alkaline earth metal and sulfur in an anhydrous ammonia environment and having a cation exchange membrane disposed between compartments containing cathode and anode within the battery, an improved anode assembly comprising:

an anodic current collector;

an anode of the alkali or alkaline earth metal in contact with the current collector; and an anolyte including essentially anhydrous ammonia; a bronze suppressing, conductivity enhancing salt of the anode metal substantially soluble in the anhyrous ammonia; and a bronze suppressing aromatic organic substance substantially soluble in the anhydrous ammonia and substantially inert to chemical reaction with both the ammonia and the anode metal.

18. The improved anode assembly of claim 17 wherein the anode metal is one of lithium, sodium, calcium and potassium.

19. The improved anode assembly of claim 17 wherein the salt is selected from a group consisting of bromides, iodides, nitrates, thiocyanates and perchlorates of the anode metal present in a concentration of between about 0.5 mole per liter and 9 moles grams per liter ammonia.

20. The improved anode assembly of claim 17 wherein the aromatic organic is selected from a group consisting of benzene, xylene and toluene present in a concentration of between about 0.5 mole per liter and about 4 moles per liter ammonia.

21. In a rechargeable battery utilizing an electrochemical pair of an alkali or alkaline earth metal and sulfur in an anhydrous ammonia environment and having a cation exchange membrane disposed between compartments containing cathode and anode within the battery, an improved anode assembly comprising:

an anodic current collector;

an anode made from a metal selected from a group consisting of lithium, sodium, calcium and potassium in contact with the current collector; and an anolyte including essentially anhydrous ammonia; a bronze suppressing, conductivity enhancing salt soluble in the anhydrous ammonia and selected from a group consisting of bromides, iodides, nitrates, thiocyanates and perchlorates of the anode metal; and a bronze suppressing organic substance substantially soluble in the anhydrous ammonia and substantially inert to reaction with both the ammonia and the anode metal selected from a group consisting of benzene, xylene and toluene.

22. The improved anode assembly of claim 21, the anode metal being sodium.

23. The improved anode assembly of claim 21, the salt being present in a concentration of between about 0.5 mole per liter ammonia and 9 moles per liter, and the aromatic being present in a concentration of between about 0.5 mole per liter and about 4 moles per liter ammonia.

24. The improved anode assembly of claim 21, the aromatic organic being present in a concentration of between about 0.5 mole per liter and 2 moles per liter ammonia.

25. In an ambient temperature rechargeable battery utilizing an electrochemical reactant pair of an alkali or alkaline earth metal and sulfur, an anhydrous ammonia anolyte and utilizing a cation exchange membrane separating anode and cathode compartments within the battery, an improved anode compartment configuration comprising:

an anodic current collector;

an anode of the alkali or alkaline earth metal in contact with the current collector; and an anolyte including: essentially anhydrous ammonia; a bronze suppressing, conductivity enhancing salt of the anode metal substantially soluble in the anhydrous ammonia; and a bronze suppressing aromatic organic substantially soluble in the anhydrous ammonia and substantially inert to chemical reaction with both the ammonia and the anode metal.

26. The improved anode configuration of claim 25 wherein the anode metal is one of lithium, sodium, calcium and potassium.

27. The improved anode configuration of claim 25 wherein the salt is selected from a group consisting of bromides, iodides, nitrates, thiocyanates and perchlorates of the anode metal present in a concentration of between about 0.5 mole per liter and 9 moles per liter ammonia.

28. The improved anode configuration of claim 25 wherein the aromatic organic is selected from a group consisting of benzene, xylene and toluene present in a concentration of between about 0.5 mole per liter and about 4 moles per liter ammonia.

29. In an ambient temperature rechargeable battery utilizing an electrochemical reactant pair of an alkali or alkaline earth metal and sulfur, an anhydrous ammonia anolyte and utilizing a cation exchange membrane separating anode and cathode compartments within the battery, an improved anode compartment configuration comprising:

an anodic current collector;

an anode made from a metal selected from a group consisting of lithium, sodium, potassium and calcium in contact with the current collector; and an anolyte including: essentially anhydrous ammonia; a bronze suppressing, conductivity enhancing salt soluble in the anhydrous ammonia and selected from a group consisting of bromides, iodides, nitrates, thiocyanates and perchlorates of the anode metal; and a bronze suppressing aromatic organic substance substantially soluble in the anhydrous ammonia and substantially inert to reaction with both the ammonia and the anode metal selected from a group consisting of benzene, toluene and xylene.

30. The improved anode configuration of claim 29, the anode metal being sodium.

31. The improved anode configuration of claim 29, the salt being present in a concentration of between about 0.5 mole per liter ammonia and 9 moles per liter, and the aromatic being present in a concentration of between about 0.5 mole per liter and about 4 moles per liter ammonia.

32. The improved anode configuration of claim 29, the aromatic organic being present in a concentration of between about 0.5 mole per liter and 2 moles per liter ammonia.

33. A rechargeable electric storage cell comprising:
a housing including an internal chamber;
a partition retained to the housing and dividing the chamber into two internal compartments, the partition being generally highly resistant to passage of chemical species therethrough but being highly receptive to the passage of a desired cationic chemical species therethrough;
a liquid seal, the seal retained in contact with and establishing a liquid seal between the partition and the housing;
an anode metal selected from a group consisting of sodium, lithium, calcium and potassium, the anode being in electrical communication with the exterior of the housing, the metal being the cationic chemical species readily passed through the partition;
an anolyte including: essentially anhydrous ammonia; a bronze suppressing, conductivity enhancing salt of the anode metal substantially soluble in the anhydrous ammonia; and a bronze suppressing aromatic organic substantially soluble in the anhydrous ammonia and substantially inert to chemical reaction with both the ammonia and the anode metal;
a cathode contained within the other compartment and in electrical communication with the exterior of the housing;
an anhydrous catholyte contained within the cathode compartment and comprising one of sulfur and alkali metal polysulfides corresponding to the alkali metal of the anode, dissolved in anhydrous ammonia; and
a pressure equalization means communicating between the compartments.

34. The electric storage cell of claim 33 wherein the anode comprises sodium and the catholyte comprises sodium polysulfides in a range of composition of from $Na_2S_4$ to $Na_2S_{18}$ dissolved in anhydrous ammonia within a range of concentration of from 2 moles per liter to saturation of the ammonia.

35. The electric storage cell of claim 33 wherein the anode comprises lithium and the catholyte comprises lithium polysulfides in a range of compositions of from $Li_2S_4$ to $Li_2S_{18}$ dissolved in anhydrous ammonia within a range of concentration of from 2 moles per liter to saturation of the ammonia.

36. The electric storage cell of claim 33 wherein the partition is a cationic exchange membrane based upon one of polyethylene and polypropylene and having functional groups selected from a group consisting of sulfonic acid, carboxylic acid, and mixtures thereof.

37. The electric storage cell of claim 33 wherein the partition includes as its principal constituent a member of a group consisting of a glass frit, sintered glass, microporous polypropylene, alumina and glass filled microporous polypropylene.

38. A rechargeable electric storage cell comprising:
a housing including an internal chamber;
a cationic exchange membrane based upon one of polypropylene and polyethylene and having functional groups selected from a group consisting of sulfonic acid, carboxylic acid and mixtures thereof dividing the chamber into an anode compartment and a cathode compartment;
a liquid seal cooperating with the membrane and the housing to prevent liquid communication between the compartments;
an anode metal selected from a group consisting of sodium, lithium, calcium and potassium, the anode being in the anode compartment and in electrical communication with the exterior of the housing;
an anolyte including: essentially anhydrous ammonia; a bronze suppressing, conductivity enhancing salt selected from a group consisting of bromides, iodides, nitrates, thiocyanates and perchlorates of the anode metal; and a bronze suppressing aromatic organic selected from a group consisting of benzene, xylene and toluene;
a cathode contained within the cathode compartment and in electrical communication with the exterior of the housing;
a catholyte comprising polysulfides of the anode metal dissolved in anhydrous ammonia within a range of concentrations of from 2 moles per liter to saturation of the ammonia; and
means for equalizing pressures between the compartments.

39. The rechargeable electric cell of claim 38, the salt being present in a concentration of between about 0.5 mole per liter ammonia and 9 moles per liter, and the aromatic being present in a concentration of between about 0.5 mole per liter and about 4 moles per liter ammonia.

40. The rechargeable electric cell of claim 38, the aromatic organic being present in a concentration of between about 0.5 mole per liter and 2 moles per liter ammonia.

41. The rechargeable electric cell of claim 38, the anode metal being sodium.

* * * * *